UNITED STATES PATENT OFFICE.

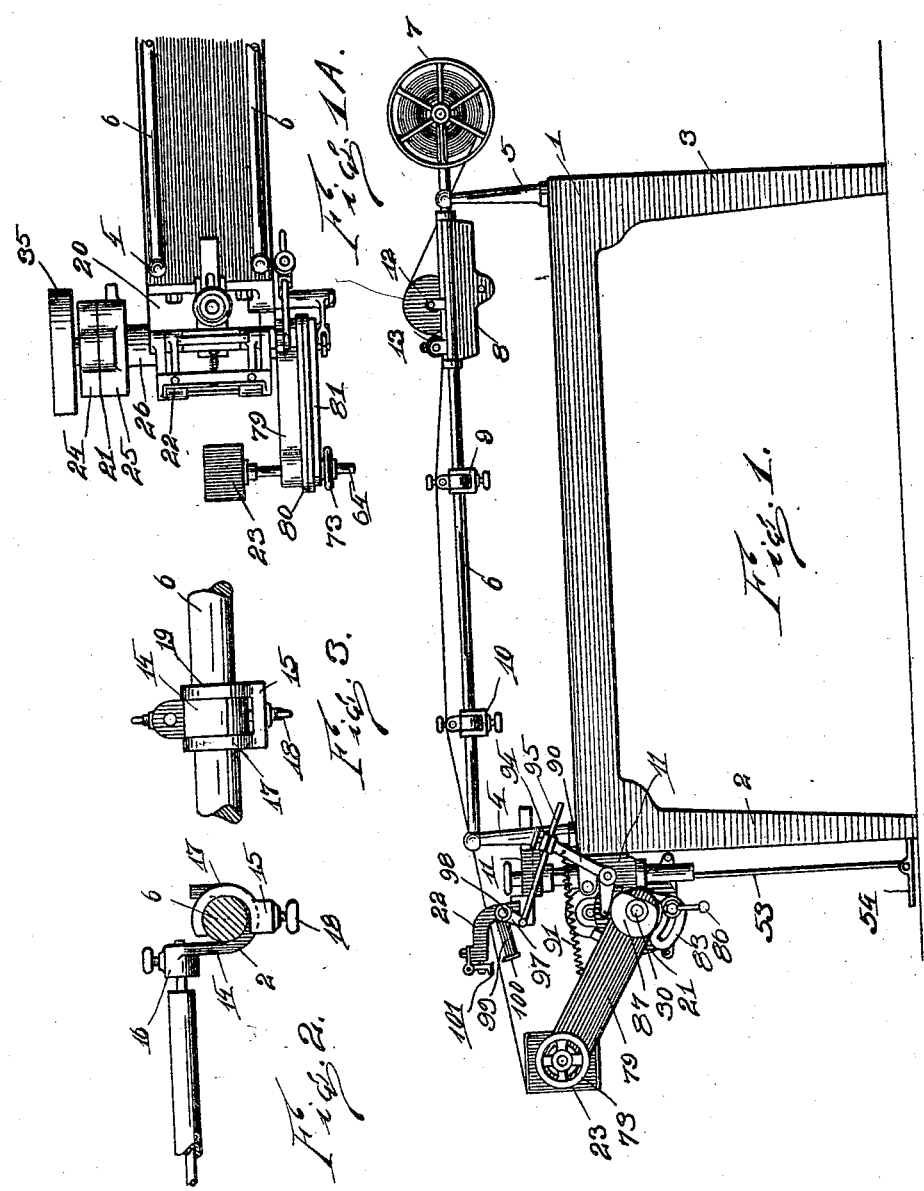

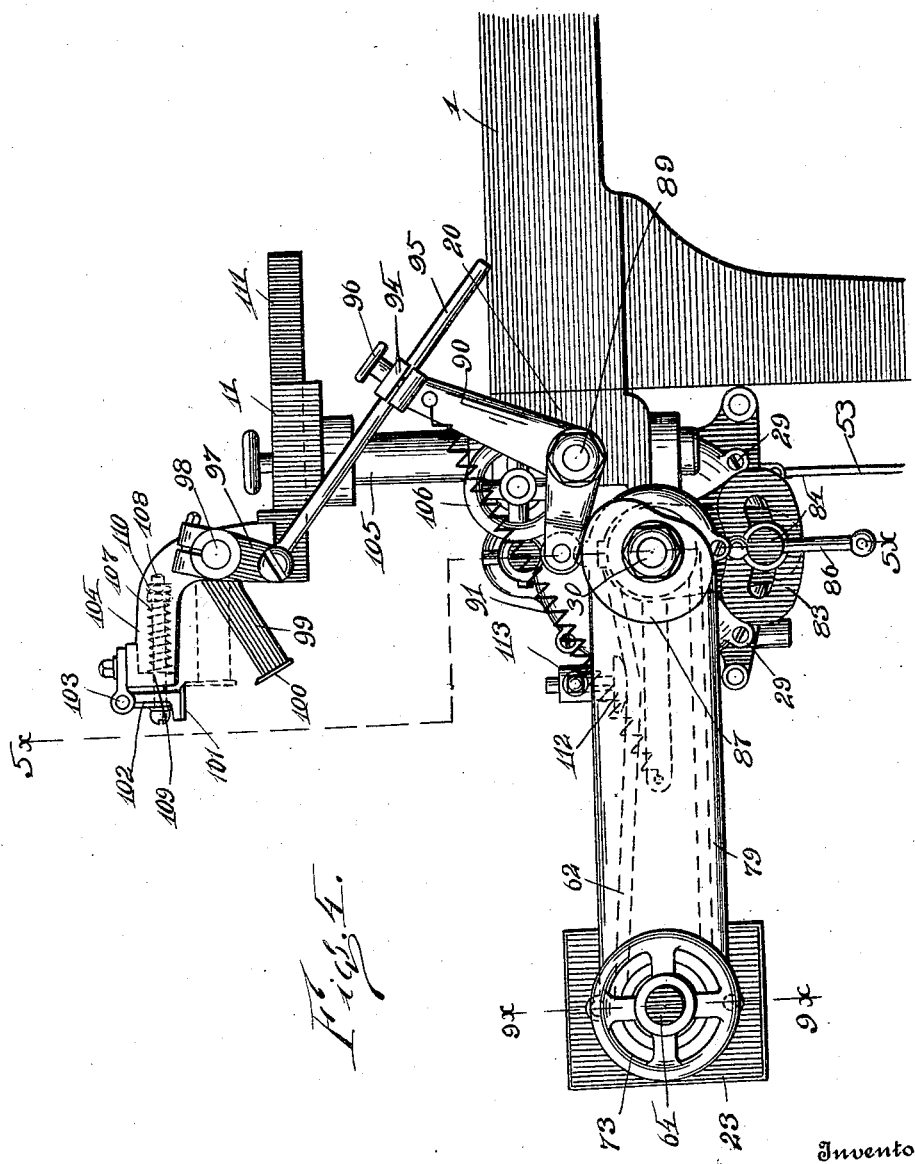

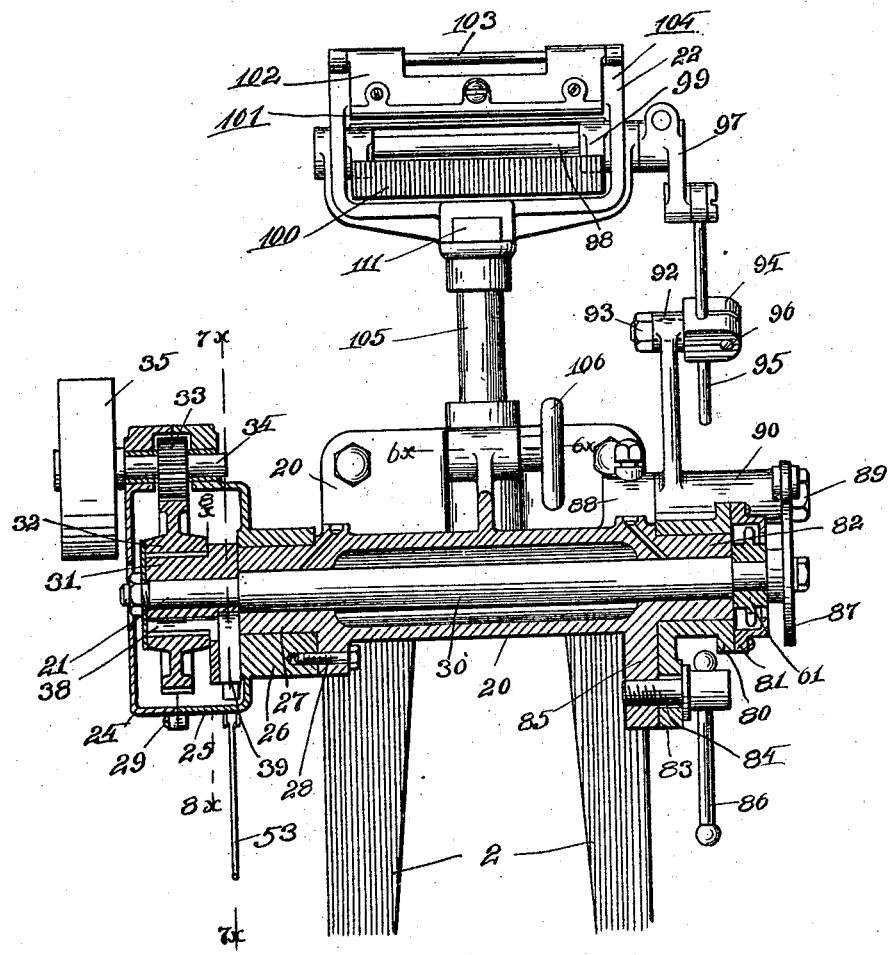
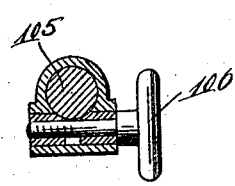

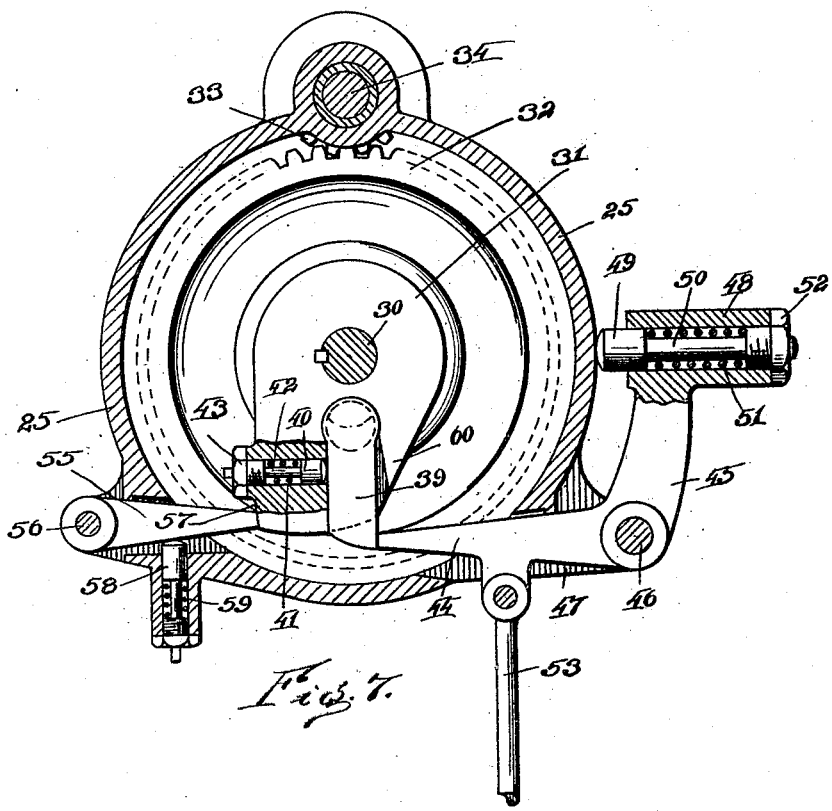

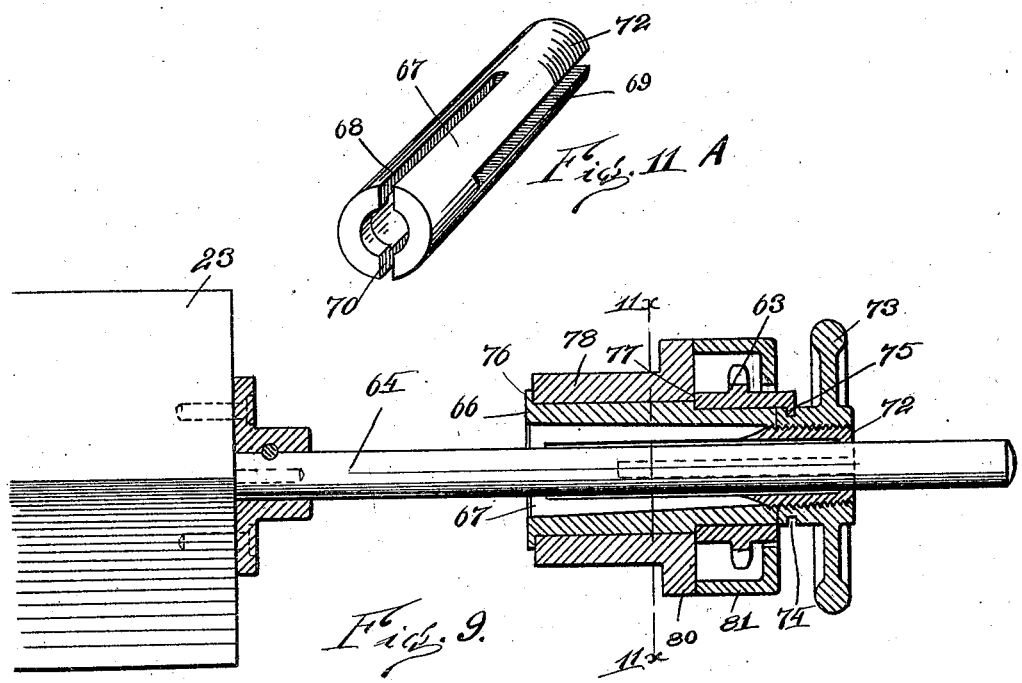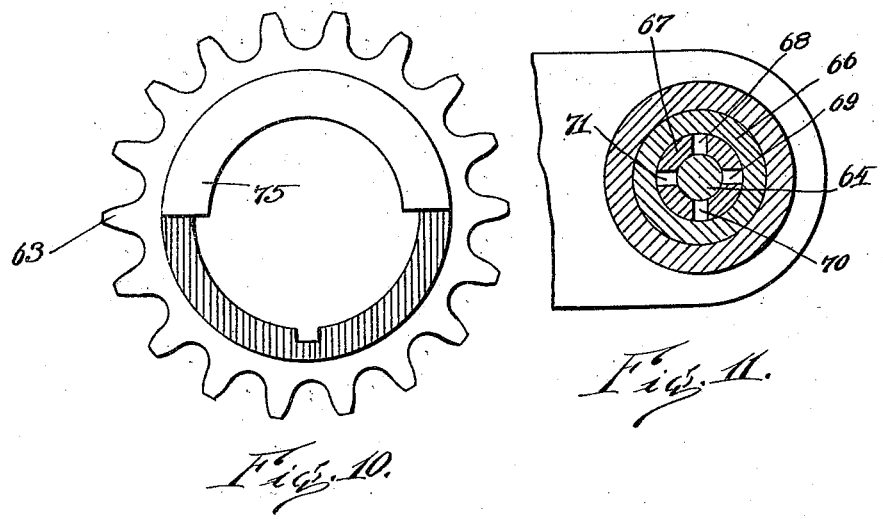

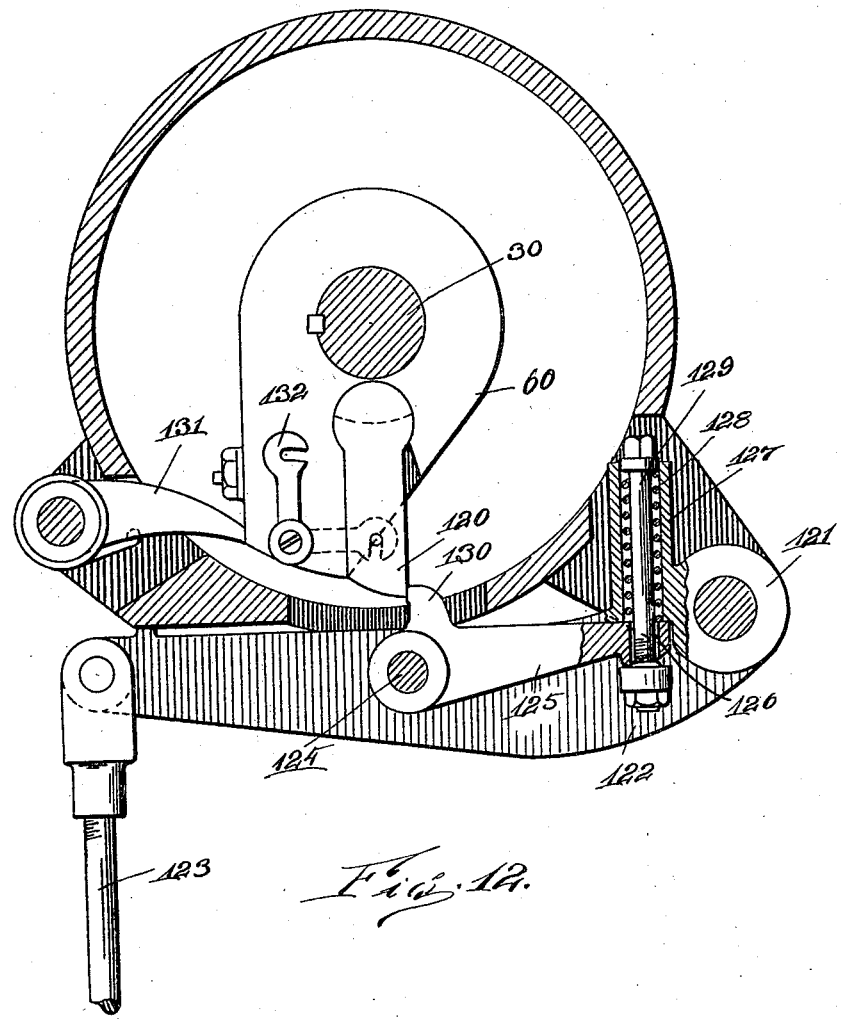

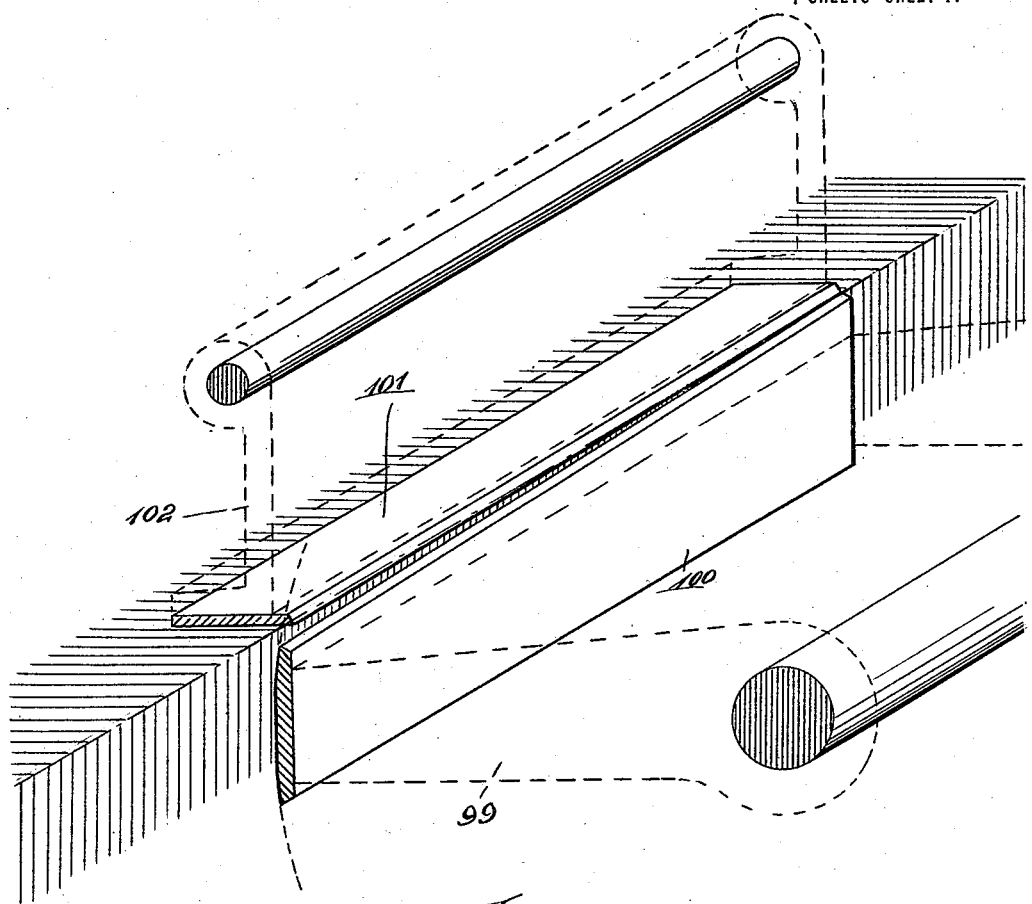

WILLIAM F. MORSE, OF ROCHESTER, NEW YORK, ASSIGNOR TO SAMUEL R. PARRY, OF ROCHESTER, NEW YORK.

BOX-COVERING MACHINE.

1,419,641.   Specification of Letters Patent.   Patented June 13, 1922.

Application filed June 29, 1918.   Serial No. 242,648.

*To all whom it may concern:*

Be it known that I, WILLIAM F. MORSE, a citizen of the United States, residing at Rochester, in the county of Monroe and State of New York, have invented certain new and useful Improvements in Box-Covering Machines, of which the following is a specification.

In the manufacture of paper boxes, the paper box is first formed up out of a blank, the sides and ends being held together with corner stays or in any other suitable manner. Thereafter the outside of the box is covered with a sheet of paper which goes around the sides and ends of the box. One edge of the cover paper is tucked down inside of the box and the other edge is folded down over the bottom of the box. This sheet of covering paper must be longer than the periphery of the box. The ends of the sheet will lap each other and what is lapped is wasted. It is, therefore, desirable to make this lap as small as possible in order to avoid waste.

Machines which are used for covering paper boxes, are provided with a mandrel or box form on which the box is placed. The mandrel is rotated with the box to facilitate the covering thereof. These machines are provided with a roll of paper from which the web of paper is fed over rollers which coat it with an adhesive and give it a sufficient exposure so as to insure the proper tempering thereof. These machines are provided with a knife which cuts the paper at any point desired by the operator. The operator applies the end of the paper web with her hand to the box and starts the box to rotating. The rotation of the box draws the paper web forward and winds it to the box and at the proper point the operator moves the knife to cut the paper after a length has been fed sufficient in the judgment of the operator to cover the box. This length will vary according to the accuracy with which the operator judges the length thereof so that more or less lap passes onto the box, most of which is wasted.

The object of this invention is to provide a machine which is provided with means for automatically cutting the cover paper at a desired, pre-determined length, which length in each case will be slightly in excess of the perimeter of the box.

Another object of the invention is to provide means by which the length of paper cut can be varied to suit the size of the box that is being covered.

These and other objects of the invention will be illustrated in the drawings, described in the specification and pointed out in the claims at the end thereof.

In the accompanying drawings:

Figure 1 is a side elevation of the complete box covering machine embodying my invention.

Figure 1$^A$ is a top plan view of the left hand end of the machine shown in Figure 1.

Figure 2 is an end elevation of one of the adjustable clamping brackets for supporting a tempering attachment.

Figure 3 is a side elevation of the bracket shown in Figure 2.

Figure 4 is an enlarged side elevation of the covering head of the machine.

Figure 5 is a vertical section, the section being taken on the line $5^x$—$5^x$ of Figure 4, the cutting mechanism being shown in end elevation.

Figure 6 is a horizontal section on the line $6^x$—$6^x$ of Figure 5, showing the clamping device for holding the cutting device at the desired elevation.

Figure 7 is a vertical, sectional view of the clutch mechanism, the section being taken on the line $7^x$—$7^x$ of Figure 5.

Figure 8 is a vertical, sectional view of the clutch mechanism, the section being taken on the line $8^x$—$8^x$ of Figure 5.

Figure 9 is a vertical section of a box form spindle and driving mechanism therefor, the section being taken on the line $9^x$—$9^x$ of Figure 4.

Figure 10 is a side elevation of a sprocket wheel for rotating the box form spindle.

Figure 11 is a vertical section through the box form spindle, the section being taken on the line $11^x$—$11^x$ of Figure 9.

Figure 11$^A$ is a perspective view of the expanding bushing.

Figure 12 is a vertical, cross sectional view of a modified form of a clutch mechanism.

Figure 13 is a perspective view of the cutting knife and ledger blade, the planes of the two knives being outlined by vertical and horizontal shade lines.

In the several figures of the drawings, like reference numerals indicate like parts.

The complete box covering machine shown in Figure 1 comprises the bed frame 1 which is supported on suitable standards 2 and 3.

On top of this bed frame are provided uprights 4 and 5 which in turn support a horizontal railing 6, on which the paper reel 7, glue pan 8 and tempering attachments 9 and 10 are mounted. At the front end of the bed frame 1 is mounted the box covering machine head 11, the detailed construction of which will hereinafter be described.

The bed frame.

The general construction of the bed frame 1 is well known in the art of box covering machines which has, as heretofore stated, the two horizontal railings 6 supported thereon. At the rear end of these railings is mounted the paper reel 7 upon which the paper supply roll is drawn. When the paper leaves the reel 7 it passes over the glue roller 12, mounted to rotate in the glue pan 8. A distributing roller 13 mounted close to and parallel to the glue roller 12, is adapted to evenly spread the glue over the surface of the paper after it has left the roller 12 and passes under the roller 13 and onto and over the tempering rollers 9 and 10. The lengthy exposure of the paper strip after it has left the glue roller 12 serves to temper the glue deposited thereon so as to increase the adhesive power thereof.

Each of the tempering rollers is mounted on a supporting bracket 14 which is adapted to be clamped to the railings 6 by means of the clamps 15. The bracket 14 is U shaped and has a bearing block 16 provided at the top on one side thereof. The bottom of the U shaped bracket 14 is adapted to engage with the railing 6 from below. A clamping screw 18 is threaded into the bottom of the clamp 15 and is adapted to be screwed up against the bottom of the U shaped bracket 14 so as to force this bracket against the under side of the railing 6 and draw the hooks 17 and 19 down on the railing to hold both the bracket 14 and clamp 15 firmly in place thereon.

After the paper leaves the last of the tempering attachments, it is guided onto the covering machine head 11.

Covering machine head.

This head is mounted on the bracket 20 which is suitably bolted to the front of the bed frame 1 and comprises a clutch mechanism 21, a cut-off mechanism 22 and a box form or mandrel 23 and its rotating mechanism.

The clutch mechanism.

This mechanism is surrounded by a casing which is formed in two sections 24 and 25 divided vertically as shown in Figure 5. The inner section 25 has a hub 26 provided thereon into which one side of the horizontal bearing block 27 formed in the bracket 20 is adapted to engage. A bolt 28 passing through a portion of the bracket 20 below the bearing block 27, is threaded into the hub 26 and holds the section 25 of the casing firmly in place on the bracket. Bolts 29 are threaded into lugs provided on the periphery of both of the casing sections 24 and 25 to hold these sections together.

The driving shaft 30 is mounted in the bearing 27 formed in the bracket 20 and has an extension of reduced diameter projecting into the inside of the casing on which the clutch member 31 and its driving gear 32 is mounted.

The driving gear 32 in turn meshes with the pinion 33 keyed to the jack shaft 34 which shaft is mounted in a suitable bearing provided in each section of the casing. A pulley 35 is keyed to the outside of the jack shaft 34 for driving the clutch mechanism. The gear 32 is provided in its hub with key ways 36, 36, four of them being shown. The pulley 35 and gears 33 and 32 rotate continuously. The gear 32 is intermittently connected to the spindle or male member 31 of the clutch mechanism as follows:

On the outside of the spindle 31 is provided an arm 60 integral therewith. In the spindle 31 is provided a recess 37 in which is mounted to rock an oval shape key 38. On the end of this key is provided a lever or crank 39 adapted to swing in a seat in the arm 60 as shown in Figure 7. This lever or crank 39 is strongly pressed in one direction by the stud 40 which is actuated by the compression spring 41 which surrounds the pin 42, forming a part of the stud, which pin passes through the plug 43 which is perforated to receive it.

The lever 39 is held in the position shown in Figure 7 by the latch 44 forming part of the bell crank 45, pivoted at 46 to a lug 47 mounted on the casing section 25. The upper end of the bell crank 45 is provided with a casing 48 in which is mounted to slide a stud 49 having a pin 50 formed thereon around which is coiled a compression spring 51. A plug 52 makes threaded engagement with the end of the casing 48 and is perforated to receive the pin 50 so that it may slide therein. Connected to the latch 44 is the link 53 connected to a treadle 54 by which it may be operated so that the latch 44 will be thrown down out of engagement with the lever 39. This permits the spring 41 to expand, pressing the stud 40 forward, which in turn rocks the lever 39 and the oval shaped key 38, throwing it into engagement with the next key way 36, by which the members of the clutch are connected so that the male member must rotate with the female member and in the same direction. The parts will rotate together as long as the latch 44 remains drawn down. As soon as the link 53 is released, the spring 51 will expand and draw the latch 44 up, causing it to engage the crank 39 as it approaches, rocking the key 38 out of engagement with the key way 36. This will bring the male member 31 to a stop and permit the female member of the clutch to rotate independently thereof.

To prevent any rebound of the spindle 31, a latch 55 is provided, pivoted at 56 at a lug provided on the casing 25, which latch engages with the shoulder 57. The latch is pressed up into engagement therewith by means of the stud 58 and spring 59, and has a limited movement in the casing.

*Driving mechanism of box form.*

Mounted on the end of the shaft 30 is provided a sprocket wheel 61 which is driven by the shaft. This sprocket wheel drives a chain 62, which in turn drives a sprocket wheel 63, which sprocket wheel drives the shaft 64 which carries the box form or mandrel 23. These sprocket wheels are of the same diameter and have the same number of teeth and the shafts to which they are connected, will therefore rotate in unison. A shoe 112 is provided to take up the slack in the chain 62. This shoe is adjustable up and down in the boss 113, in which it is clamped by a set screw.

Interposed between the sprocket wheel 63 and the shaft 64 are the bushings 66 and 67. The bushing 66 has a tapered seat therein as shown in Figure 9, and the bushing 67 has four slots therein, the even numbered slots 68 and 70 starting from the left hand end as shown in Figure 11^A and the odd numbered slots 69 and 71 starting from the right hand end of the bushing as shown in Figure 11^A. The odd numbered slots extend past the even numbered slots. This bushing 67 normally stands out away from the shaft 64 and can be compressed closely against it. The bushing 67 is tapered to fit the tapered seat of the bushing 66 so that it will, as it moves to the right, have its sections drawn together against the shaft 64. The bushing 67 is threaded on the right hand end thereof as shown at 72. On this threaded end is mounted a hand wheel 73 which makes threaded engagement therewith. On the hub of the hand wheel is the annular groove 74 with which engages the semi-circular flange 75 on the sprocket wheel 63. This connection causes the hand wheel and the sprocket wheel to move laterally together and permits the removal of the hand wheel when the shaft 64 and the bushing 67 are withdrawn. On the end of the bushing 66 is provided a flange 76 and at an intermediate place is provided a shoulder 77, against which rests the hub of the sprocket wheel 63. The hub of the sprocket wheel forms a flange parallel to the flange 76 between which the boss 78 is engaged, by which engagement the rotating parts are held in place in the bearing.

By the rotation of the hand wheel 73, the bushing 67 is drawn to the right through the bushing 66 which remains stationary in the bearing. The bushing 67 is contracted on the shaft 64 so as to take a firm grip thereon by its endwise movement through the bushing 66, and rigidly fastens the bushing 66 and the shaft 64 together so that they all rotate together. By turning the hand wheel 73 in the reverse direction the bushing 67 is moved to the left and the shaft 64 is released so that it can slide in the bushing either to the right or left and be clamped to rotate in the new position. The mandrel can also be adjusted angularly so as to modify its starting and stopping position. After it has once been set, the mandrel will always stop in the same position, due to the fact that it is positively geared to the shaft 30, which is held against oscillation by the latches 55 and 44 which engage directly and indirectly with the arm 60 keyed to the shaft 30 at the end of the revolution of the shaft.

The casing 79 is divided longitudinally into two halves 80 and 81. The shaft 64 is carried at one end of this casing and the other end of the casing swings around the shaft 30 as a center, a bearing 82 being interposed between the shaft and the casing. At the right hand end of the casing 79 is provided a plate 83, having a segmental slot therein, through which passes a stud 84, which stud engages with a lug 85. On the outer end of the stud is provided a handle 86 by which it may be readily turned to release or clamp the segment 83 in the desired position. By means of this mechanism, the casing 79 and the box form carried thereby may be raised or lowered, placing it nearer to or further away from the knife which cuts the covering paper.

*Paper cutting mechanism.*

Keyed on the shaft 30 is the cam 87. On the bracket 20 is provided the lug 88, in which is clamped a spindle 89. (See Figures 4 and 5.) Mounted to rock on this spindle is the bell crank 90, the lower arm of which engages with the cam 87 and is rocked thereby. The bell crank is held in engagement with the cam by the spring 91. On the end of the upper arm of the bell crank is provided a boss 92 through which passes a stud 93, which stud is integral with a split block 94. Through this split block passes a link 95, the block being clamped on the link by the screw and hand wheel 96. At the upper end the link 95 is connected to the crank 97, which crank is clamped on the shaft 98, which shaft carries a swinging arm 99 provided on its outer end with a cutting knife 100. This cutting knife works against the ledger blade 101 which is mounted on a bracket 102, pivoted at 103 to the stationary bracket 104, which bracket is carried on a bar 111 mounted to slide in a grooved head on the stem 105, which stem is adjustable up and down and can be clamped in place by a hand wheel 106. The bracket 102 is held in the forward position shown in Figure 4 by means of a spring 107 coiled around a pin 108. The rear end of the spring 107 bears against a flange 109 of the bracket 104 and the forward end of the spring bears against a jam nut 110 threaded on the pin 108. The other end of the pin extends through the bracket 102 and has a round head thereon with which it engages the bracket. This head is provided with a slot which permits the pin to be turned by a screw-driver.

The knives 100 and 101 are set with reference to each other so as to make a double shear, cutting the web of paper substantially at right angles to its length. As the knife 100 swings up, the knife 101 can yield a little so as to adjust itself to the knife 100 and make firm contact therewith.

The side of the cutting knife 100 toward the ledger blade 101 is ground cylindrical. The cutting edge of the cutting knife is at an angle to the axis of the cylindrical surface and follows a spiral line on the cylindrical surface. The blades or planes of the knives 100 and 101 come together substantially at right angles to each other. The cutting knife 100 is set with its edge at a considerable angle to the plane of the ledger blade. This is necessary in order to secure good shearing action. The ledger blade is set with its edge at a smaller angle to the plane of the cutting knife. This angle is only so much as may be necessary to move the ledger blade enough so that the contact between the knives is confined to the point where their edges cross each other in their shearing action. The angle which the edge of the knife 101 makes with the plane of the knife 100 is sufficient so that the edge of the knife 100 as it moves up and comes into contact with the edge of the knife 101 will push the knife 101 back faster than the bevel of the knife 100 approaches the edge of the knife 101. This will keep the knives apart except at the point where the edges cross each other and there the knives will operate both to shear the paper and sharpen each other. The paper passes under the ledger blade 101 and the glued surface of the paper is underneath and only the edge of the knife 100 comes into contact with the glued surface and there is, therefore, but little chance of fouling either of the knives in consequence.

The relative position of the two knives when they first come together for the purpose of cutting is shown in Figure 13. In this figure, the knife 100 is shown just beginning to make contact with the knife 101. The planes of the two knives are shown in section lines. The section lines indicating the plane of the knife 100 intersect a triangular shaped portion of the knife 101, the apex of which triangle is at the right hand corner and the base of the triangle is at the left of the knife 101 in Figure 13. The edge of the knife 101 is the hypotenuse of the triangle. The plane of the knife 101 projected makes contact with the upper right hand corner of the knife 100 and passes above the upper left hand corner of the knife, leaving a triangular space between the plane and the edge of the knife, the point of which triangular space is at the right of the knife 100 and the base of the triangular space is at the left of the knife 100. The edge of the knife 100 is the hypotenuse of the triangular space referred to. It will be seen from this figure that when the cutting edges of the two knives are in contact at the right, the left hand end of the knife 101 projects over the knife 100 and the left hand end of the knife 100 stands at some distance below the plane of the knife 101 and does not make contact therewith at any point except at the right hand end. The relation of the edges of the knives will be reversed after the cutting operation has been completed. The edges of the knives 100 and 101 will be in contact at the left and will be separated from each other at the right, the right hand edge of the knife 100 extending above the plane of the knife 101.

*Operation of machine.*

In the operation of the machine, the box form is adjusted, that is, expanded or contracted, in the usual way to fit the box that is to be covered, it being understood that a large number of them of the same size are to be covered consecutively. The shaft 64 is adjusted longitudinally so as to make the box form center with the web of paper that is fed from the supply roll and is adjusted angularly so as to start the box from a convenient position to receive the forward end of the paper web. The casing 79 is raised for a small box as shown in Figure 1 and lowered for a large box as shown in Figure 4.

The operator places the box on the mandrel and takes the loose end of the paper web and draws it forward between the knives and applies it to the box slightly in advance of a predetermined point on the box, at which the rear end of the paper will always terminate. The operator then presses the treadle 54 which closes the clutch 31 and 32 and starts the rotation of the mandrel. This, in turn, draws the paper forward. At the same time the cam 87 rotates and at the proper moment causes the bell crank 90 to rock and move the knife to sever the paper. The paper so severed will be sufficient to cover the box and reach the pre-determined starting point, overlapping the front end of the paper. With a very small box, the mandrel and the knives are brought fairly close together, while with a large box they are put further apart. To bring the mandrel and the knives closely together, the stem 105 can be lowered, the bracket 104 can be set forward in the head 111 and the casing 79 can be swung up as shown in Figure 1. When the machine is set for working on a large box, the casing 79 can be lowered to the position shown in Figure 4, the stem 105 can be raised and the bracket 104 can be set back thereon as shown in Figure 4.

In Figure 12 I have shown a modified form of the clutch mechanism. The arm 60 is shown keyed on the shaft 30. In the arm 60 is pivotly mounted a crank 120. Mounted on the case is a stud 121 on which swings a lever 122 operated by a link 123. On the lever 122 is carried a stud 124. On the stud 124 is pivotly mounted the latch 125. This latch is perforated at the end as indicated at 126. On the arm immediately above this perforation is provided a sleeve 127 in which is contained a compression spring 128. A bolt 129 is provided having nuts and washers on each end thereof, forming heads. The head on the upper end holds the spring 128 in place against the end of the crank 125 and the head on the lower end holds the latch 125 in place against the sleeve. The latch 125 has a projection 130 thereon which engages the crank 120.

The operation of this clutch is as follows: When the link 123 is pulled down, the lever 122 is drawn down with it carrying down the latch 125 releasing the crank 120 which is then thrown forward by a spring similar to that shown in Figure 7, closing the clutch as above described and causing the rotation thereof. When the lever 122 returns to the position shown in Figure 12, the latch 125 engages the crank 120 and opens the clutch and stops the rotation thereof. The momentum of the moving parts of the clutch causes it to strike quite a blow when the parts are brought to rest and the shock is taken up by the spring 128 as follows.

The crank 120 strikes the projection and rocks the latch around the stud 124 causing the outer end to draw down on the bolt 129 and compress the spring 128. The spring then expands and brings the parts back to normal. A pawl 131 is provided which engages the arm from the rear side thereof and prevents a rebound thereof, when the clutch is stopped. A latch 132 is provided which locks the crank 120 from swinging forward and makes the clutch inoperative.

I claim:

1. In a box covering machine, the combination of a spindle, a box form mounted on the end thereof, a bearing for said spindle, bushings interposed between said spindle and said bearing and adapted to rotate with the spindle, and a hand wheel for clamping said bushings to or release them from said spindle.

2. In a box covering machine, the combination of a spindle, a box form mounted on the end thereof, a bearing for said spindle, bushings interposed between said spindle and said bearing and adapted to rotate with the spindle, and a hand wheel for clamping said bushings to or releasing them from said spindle, said spindle being adjustable longitudinally and angularly in said bushings in any position.

3. In a box covering machine, the combination of a box form, a spindle supporting said box form, a sprocket wheel and chain gearing for driving said spindle, said spindle being mounted in a bearing adapted to swing around a fixed center from which it is driven, means for clamping said bearing in any desired position and means for rotating said spindle and stopping it uniformly in a predetermined angular position.

4. In a box covering machine, the combination of a box form, a chain and sprocket gearing for rotating said box form, a shaft for driving said chain gearing, a clutch for driving said shaft, means for manually closing said clutch and means for automatically opening said clutch and positively stopping the rotation of the shaft and locking it in a predetermined angular position.

5. In a box covering machine, the combination of a box form adapted to have a continuous strip of paper fed thereto, a cut off mechanism adapted to cut off the strip of paper fed to said box form, an individual driving mechanism for said cut off mechanism and an individual driving mechanism for said box form, each of said individual driving mechanisms being adjustable with relation to the other, a common driving mechanism for both of said individual driving mechanisms, and controlling means operating on said common driving mechanism to control said two driving mechanisms of said cut off mechanism and said box form so as to automatically move said box form and said cut off mechanism into a predetermined position with relation to each other during each revolution of said box form.

6. In a box covering machine, the combination of a box form, a spindle supporting said box form, a swinging arm in which said spindle is carried, a driving shaft around which said arm swings, a chain gearing between said spindle and said shaft, a cam on said shaft, a knife for cutting the wrapping paper, and means for driving said knife from said cam.

In testimony whereof I affix my signature.

WILLIAM F. MORSE.